(12) United States Patent
Barrenscheen (10) Patent No.: US 12,153,489 B2
(45) Date of Patent: *Nov. 26, 2024

(54) ELECTRONIC CIRCUIT WITH LOCAL CONFIGURATION CHECKERS WITH UNIQUE ID CODES

(71) Applicant: Infineon Technologies AG, Neubiberg (DE)

(72) Inventor: Jens Barrenscheen, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,775

(22) Filed: Aug. 15, 2023

(65) Prior Publication Data
US 2024/0004758 A1 Jan. 4, 2024

Related U.S. Application Data

(63) Continuation of application No. 17/512,853, filed on Oct. 28, 2021, now Pat. No. 11,748,193.

(51) Int. Cl.
G06F 11/10 (2006.01)
G06F 11/07 (2006.01)
G06F 11/30 (2006.01)

(52) U.S. Cl.
CPC ...... *G06F 11/1068* (2013.01); *G06F 11/0763* (2013.01); *G06F 11/0772* (2013.01); *G06F 11/3027* (2013.01)

(58) Field of Classification Search
CPC ............ G06F 11/1068; G06F 11/0763; G06F 11/0772; G06F 11/3027
USPC .................. 714/764, 766, 768, 773, 799
See application file for complete search history.

(56) References Cited

U.S. PATENT DOCUMENTS

| | | | |
|---|---|---|---|
| 7,024,547 B2 * | 4/2006 | Kartoz | G06F 9/4411 713/1 |
| 7,683,663 B1 * | 3/2010 | Tsai | G06F 21/76 326/38 |
| 10,250,279 B2 | 4/2019 | Hanzler | |

(Continued)

OTHER PUBLICATIONS

Notice of Allowance dated May 3, 2023 for U.S. Appl. No. 17/512,853.

*Primary Examiner* — John J Tabone, Jr.
(74) *Attorney, Agent, or Firm* — Eschweiler & Potashnik, LLC (57) ABSTRACT

An electronic circuit includes a data bus, a first module, and a second module. The first module is coupled to the data bus and corresponds to a first address. The first module performs a first function and includes a first storage location for first configuration data for the first function and first error checking data. The first module also includes a first local configuration checker having a first identification code. The first error checking data is based on the first configuration data and the first identification code. The second module is coupled to the data bus and corresponds to a second address. The second module performs a second function and includes a second storage location for second configuration data and second error checking data. The second module also includes a second local configuration checker having a second identification code that is distinct from the first identification code.

16 Claims, 2 Drawing Sheets

(56) References Cited

U.S. PATENT DOCUMENTS

| | | | |
|---|---|---|---|
| 11,748,193 B2 * | 9/2023 | Barrenscheen | G06F 11/1004 714/764 |
| 2001/0015919 A1 * | 8/2001 | Kean | G06F 21/76 711/E12.092 |
| 2012/0036369 A1 * | 2/2012 | Chang | G11C 16/22 714/E11.159 |
| 2013/0290797 A1 * | 10/2013 | He | G11C 29/08 714/E11.159 |
| 2021/0342220 A1 * | 11/2021 | Chen | G06F 3/0653 |
| 2022/0077895 A1 * | 3/2022 | Harney | H01Q 7/00 |
| 2023/0135490 A1 * | 5/2023 | Barrenscheen | G06F 11/3027 714/764 |
| 2024/0004758 A1 * | 1/2024 | Barrenscheen | G06F 11/1068 |

* cited by examiner

ELECTRONIC CIRCUIT WITH LOCAL CONFIGURATION CHECKERS WITH UNIQUE ID CODES

This application is a continuation of U.S. application Ser. No. 17/512,853, filed on Oct. 28, 2021, the contents of which are hereby incorporated by reference in their entirety.

FIELD

The present disclosure relates in general to integrated circuits, and more particularly to integrated circuits with local configuration checkers that make use of unique identification codes for various modules within those integrated circuits.

BACKGROUND

Moore's law is a concept in the world of electronics that states the number of transistors on an integrated circuit (IC) doubles approximately every two years. Because of Moore's law, ICs include more and more functionality with each successive generation. For example, while several decades ago an IC may have consisted of an arithmetic logic unit (ALU) due to the number of available devices on the IC, today's ICs can include significant amounts of memory, multiple microprocessors (each providing more functionality than a simple ALU), and an entire suite of peripherals to provide system level functionality from a single IC.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware.

As generations of integrated circuits (ICs) become more and more complex, the ICs typically include more and more modules which are integrated on each chip and which are capable of carrying out different functions for the IC. Thus, modern ICs offer more complex functionality than previous generations of ICs. These modules are typically connected together through one or more buses. Although this is beneficial for the end users because of the additional functionality provided by these ICs, configuring these ICs at start-up, however, has become more and more complex as additional modules are added. This is particularly true in applications where safety concerns are paramount. For example, in many automotive systems where the automobile carries human passengers and/or valuable cargo, errors due to failures in modules of an IC can be dangerous.

To quantify the level of risk in automotive systems in particular, the automotive industry uses Automotive Safety Integrity Level (ASIL), which is a risk classification scheme defined by International Standards Organization (ISO) 26262—Functional Safety for Road Vehicles standard. The ASIL is established by performing a risk analysis of a potential hazard by looking at the severity, exposure, and controllability of the vehicle operating scenario. The safety goal for that hazard hi turn carries the ASIL requirements. There are four ASILs identified by the standard: ASIL A, ASIL B, ASIL C, ASIL D. ASIL D dictates the highest integrity requirements on the product and ASIL A the lowest. Hazards that are identified as Quality Management (OM) do not dictate any safety requirements.

Generally, modules within a given IC are configured by programming data to the various modules, and more specifically by writing configuration data over a data bus to a bank of registers for each module. For example, the configuration data can be stored in non-volatile memory, and upon start-up of the IC, the configuration data can be fetched from the non-volatile memory and written to the various modules. The configuration data may adjust thresholds or set-points of the various modules, or may define reactions that a module performs when various events are detected by the module or by other modules in the system. In some cases, the integrated circuit includes sufficient non-volatile memory to store the configuration data and other needed content, but the non-volatile memory may be manufactured with a lesser required safety rating than is required for the overall IC and/or system. For example, the local non-volatile memory can be designed according to QM standard (e.g., flash memory, but not radiation-hardened flash memory), whereas the data it contains is used for other modules with much higher ASIL ratings. To ensure the content of the configuration data is correct, error checking codes (ECCs) are used to allow the identification of corrupted data or to even allow the correction of corrupted data in some cases. However, the use of ECCs only confirms the correctness of the data, and does not confirm whether that data is written to the correct location within the system.

As been appreciated in some aspects of the present disclosure, it is imperative that the correct configuration data is used for the various modules, and moreover, that this correct configuration data is written to the correct location within a module. Thus, if wrong configuration data is written to the correct location within a given module, and/or if the correct configuration data is written to the wrong location within a module, either of these conditions may lead to a violation of an overall safety goal. To provide an economical solution to this issue, the present disclosure provides an approach that includes local configuration checkers within the various modules. These local configuration checkers check not only whether the content of the configuration data is correct, but also use local identifiers to determine whether the configuration data is written to the correct location within the system. In this way, some aspects of the present disclosure provide an approach where the memory can be designed according to a more economical ASIL rating, such as a QM rating, while the overall IC can still have a higher ASIL rating due to the presence of the local configuration checkers.

In the following, the wording "configuration data" describes all data that may change the behavior or operating point of an electronic circuit or module. Also, the wording "error checking data" or "error checking codes" is used for all kinds of codes that may only provide error detection capability or additionally also error correction capability.

Figure 1:
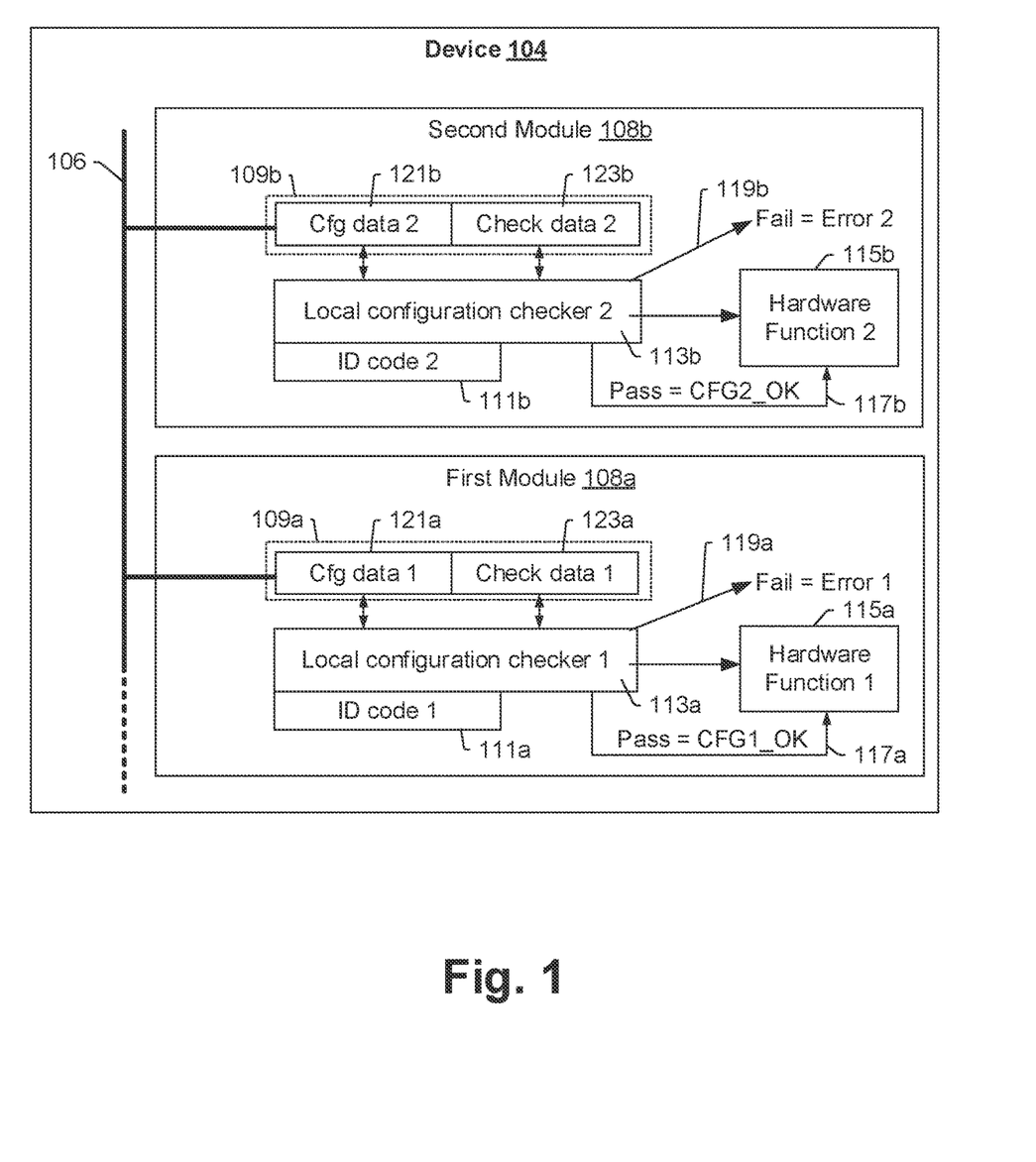
FIG. 1 illustrates an example of an electronic circuit including modules with local configuration checkers in accordance with some embodiments.

FIG. 1 illustrates an example of an electronic device 104 that includes a first module 108*a* and a second module 108*b* which are coupled together via a data bus 106. In some cases, the first and second modules 108a, 108b and data bus 106 are implemented in hardware, and thus, can manifest as a circuit including semiconductor transistors on a semiconductor substrate, with an interconnect structure including conductive wiring connecting the transistors together to achieve this functionality.

The first module 108a corresponds to a first address and is configured to perform a first function 115a. The first module 108a includes a first storage location 109a, such as a register or other memory, to store first configuration data 121a (e.g., Cfg data 1) and first error checking data 123a (e.g., Check data 1). The first module 108a also includes a first local configuration checker 113a having a first identification code 111a. The first error checking data 123a is based on the first configuration data 121a and the first identification code 111a. The first local configuration checker 113a is configured to deliver a first pass/fail indication based on the first configuration data 121a, the first error checking data 123a, and the first identification code 111a. More particularly, in case of a first pass indication (e.g., 117a), the first module 108a is configured to perform the first function 115a according to the first configuration data 121a; while in case of a first fail indication (e.g., 119a), the first module 108a is configured to perform the first function 115a according to a default configuration that has less than full functionality for the first function 115a. Thus, for example, the first local configuration checker 113a can provide a first pass indication 117a (Pass=CFG1_OK) by generating a first hash value based on the first configuration data 121a and the first identification code 111a, and then comparing that first hash value to the first error checking data 123a. If the first hash value is equal to the first error checking data 123a, then the first pass indication 117a is asserted and the first function 115a is enabled—for example, with full functionality. If the first hash value differs from the first error checking data 123a, then the first fail indication 119a (Fail=Error 1) is asserted and the first function 115a is enabled with a default configuration—for example, with less than full functionality and/or in some type of safe mode that limits full functionality.

In a first example, the first local configuration checker 113b may check the data contents of the first storage locations 109b for the configuration data and the error checking data. This may be the case if there are several storage locations needed to store the total amount of information to be checked, e.g. at several addresses. In another example, the first local configuration checker 113b may check the data intended to be written to the respective storage elements just before the data are stored. In this case, only data leading to a pass indication may be stored, whereas data leading to a fail indication may be rejected and not stored. In this way, valid data are not overwritten by invalid data. This scheme may be applied if a single write operation comprises all required information, e.g. only a few bits.

Further, the second module 108b corresponds to a second address and performs a second function 115b, which can be the same or different than the first function 115a. The second module 108b includes a second storage location 109b, such as a register or other memory, to store second configuration data 121b and second error checking data 123b. The second module 108b further includes a second local configuration checker 113b having a second identification code 111b that is distinct from the first identification code 111a. The second error checking data 123b is based on the second configuration data 121b and the second identification code 111b. The second local configuration checker 113b is configured to deliver a second pass/fail indication based on the second configuration data 121b, the second error checking data 123b, and the second identification code 111b. More particularly, in case of a second pass indication 117b, the second module 108b is configured to perform the second function 115b according to the second configuration data 121b; while in case of a second fail indication 119b, the second module 108b is configured to perform the second function according to a default configuration. Thus, for example, the second local configuration checker 113b can provide a second pass indication 117b (Pass=CFG2_OK) by generating a second hash value based on the second configuration data 121b and the second identification code 111b, and then comparing that second hash value to the second error checking data 123b. If the second hash value is equal to the second error checking data 123b, then the second pass indication 117b is asserted and the second function 115b is enabled—for example, with full functionality. If the second hash value differs from the second error checking data 123b, then the second fail indication 119b is asserted and the second function 115b is enabled in a default configuration—for example, with less than full functionality and/or in some type of safe mode that limits full functionality.

Although the example of FIG. 1 has been described with reference to hash functions being used within the local configuration checkers, other approaches are also possible. For instance, in other approaches, the first ID code 111a can correspond to the first address value of the first module 108a or otherwise be derived from the first address value; and the first checking data 123a can include the first address value. Thus, the local configuration checker 113a can compare the first address value in the first checking data 123a with the first address value of the first ID code 111a to generate the first pass/fail indication (e.g., 117a or 119a). In another example, the first ID code 111a may be a numeric value attributed to the first module, e.g. following an enumeration scheme. It is advantageous (but not mandatory) that the ID codes attributed to the modules in a device are unique.

Thus, the use of local configuration checkers on an electronic device allows functionality of various modules to be individually enabled and/or disabled based on whether configuration data and/or error checking data is properly provided to the various modules. For example, in the example of FIG. 1, if the first module 108a has an error in its configuration data or error checking data in first storage location 109a, then the first module 108a can be operated in a safe mode where less than full functionality is provided by the first function 115a of the first module 108a. At the same time, the second function 110b of the second module 108b can still operate with its full functionality so long as its configuration data and error checking data are correctly stored in second storage location 109b. In safety relevant systems, such local configuration checkers can provide a reliable and economical alternative, compared to other approaches that make use of redundant hardware which can be expensive and/or consume significant power.

Figure 2:
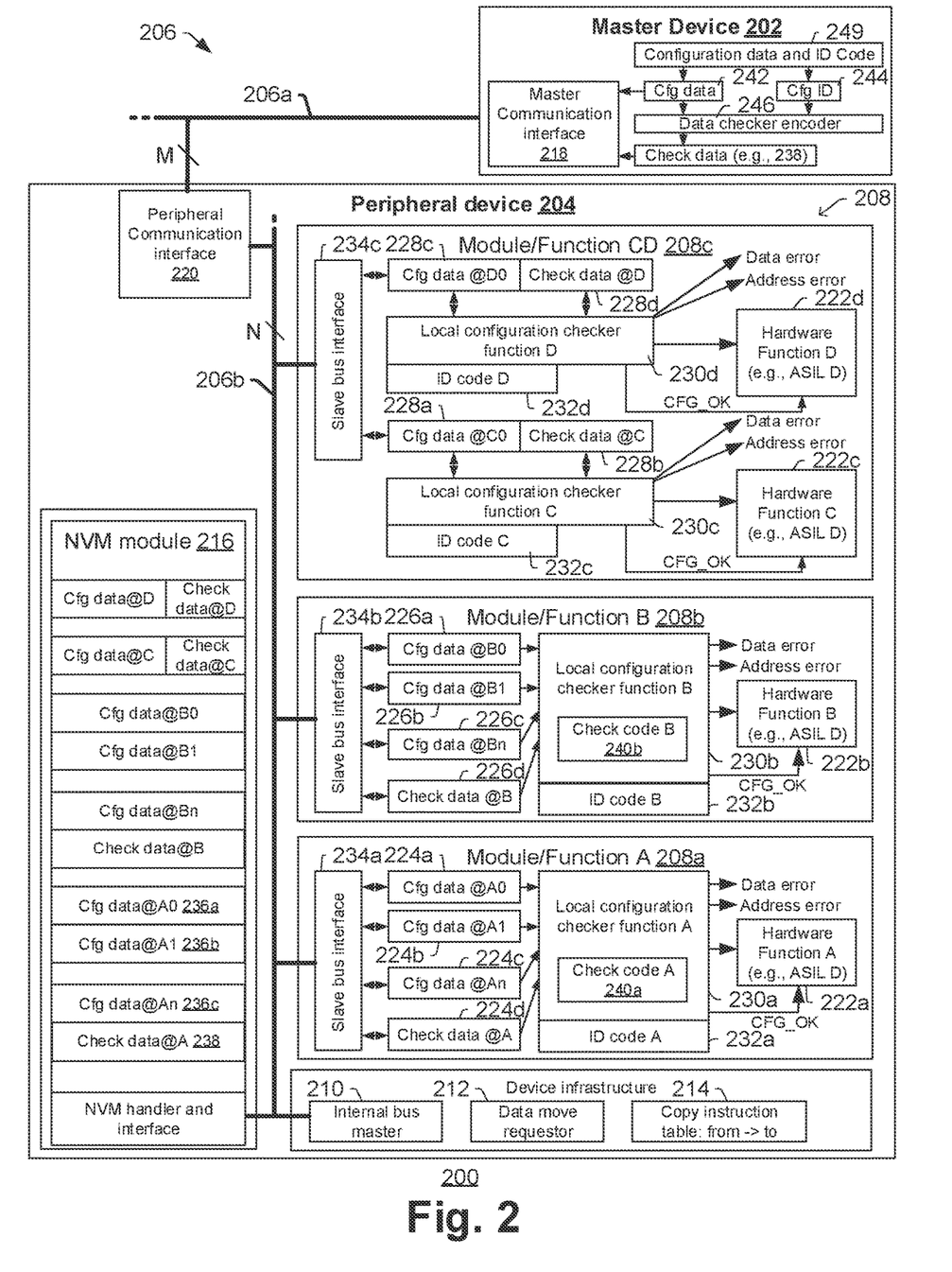
FIG. 2 illustrates another example of an electronic circuit including modules with local configuration checkers in accordance with some embodiments.

FIG. 2 illustrates a more detailed depiction of an electronic circuit 200 in accordance with some embodiments. The electronic circuit 200 includes a master device 202 and a peripheral device 204 that are coupled together by a data bus 206. Typical examples for that type of data bus are SPI (serial peripheral interface), LIN (local interconnect network), IIC (inter-IC bus) or the like. The peripheral device 204 includes a number of modules 208 (e.g., first module 208a, second module 208b, and third module 208c), which are configured to be setup and/or used under the direction of the master device 202. The data bus 206 can also couple the master device 202 (via a peripheral communication interface block 220) to other components within the peripheral device 204 including an internal bus master module 210, a data move requestor module 212, a module including a table of instructions 214, and/or to one or more memory modules and/or, such as a non-volatile memory (NVM) module 216. In some cases, the NVM module 216 can manifest as flash memory, one-time-programmable (OTP) memory, or EEPROM.

In the illustrated example, the data bus 206 includes a first data bus 206a, which can be an external data bus in some cases, and a second data bus 206b, which is an internal data bus. The first data bus 206a extends between a master communication interface block 218 within the master device 202 and a peripheral communication interface block 220 within the peripheral device 204. The second data bus 206b extends from the peripheral communication interface block 220 to the individual modules 208 within the peripheral device 204. In some embodiments, the first data bus 206a is M-bits wide and the second data bus 206b is N-bits wide, wherein N may be greater than or equal to M (e.g. first data bus 206a may be a serial data bus and second data bus 206b may be a parallel data bus). Thus, the address space available to the master device 202 may be greater than or equal to the address space of the peripheral device 204, and/or additional modules may be present on the first data bus 206a in addition to what is illustrated.

In some cases, the peripheral device 204 is an integrated circuit disposed on a single semiconductor die or chip, such as a monocrystalline silicon substrate or silicon on insulator (SOI) substrate; while in other cases the peripheral device 204 can be spread among multiple semiconductor chips. Further, in some cases, the master device 202 can manifest as a microcontroller and/or other programming platform; and can be disposed on the same die or chip as the peripheral device 204 or as another chip/die/circuit that is distinct from the peripheral device 204. The master device can also manifest as a tester with probe pins or other structures to couple to the peripheral device 204.

In the illustrated example, the peripheral device 204 includes the first module 208a, the second module 208b, and the third module 208c. The first module 208a is coupled to a first address location on the data bus 206, the second module is coupled to a second address location on the data bus 206, and the third module 208c is coupled to a third address location on the data bus 206. Each of the modules 208 can include its own hardware circuitry to implement predetermined functionality. For example, in an automotive application, the first module 208a can include first hardware function 222a including a sensor to measure an environmental condition (e.g., pressure or temperature), the second module 208b can include second hardware function 222b to measure an angular position such as a throttle or driveshaft, and the third module 208c can include hardware to implement engine control, including third hardware function 222c to implement a valve control function and fourth hardware function 222d to implement an ignition distribution function—though any other functionality for the modules can also be present and these functions are merely examples for clarity. In another example, first module 208a may include a supply generation for another module or device, such as master device 202 (e.g. a micro controller). In this example, second module 208b may include a supervision function (e.g. a voltage monitoring circuit) configured to monitor correct operation of the supply generation.

Each of the modules 208 may receive all signals on the second data bus 206b, including address bits, data bits, and a read/write indication to differentiate between read and write access to data bits, and optionally other signals. The data of first module 208a may be available at a first address or range of addresses (e.g., @A, @A0, @A1, @An), the second module 208b at a second address or range of addresses (e.g., @B, @B0, @B1, @Bn), and the third module 208c at a third address or range of addresses (e.g., @C, @C0, @D, @D0).

In the given example, there are two different ways how to access the registers of the modules 208. The first option includes a data transfer of data stored in the master device 202 to the peripheral device 204 by an access controlled by the master device 202 via data bus 206a (configuration with external data). The second option includes a data transfer of data already stored in the NVM of the peripheral device to locations in modules 208 (configuration with internal data).

Thus, under either the first option or the second option, when the master device 202 (or another module) transmits the first address on the data bus 206 together with a write request and write data during a first time, the first module 208a detects the presence of the first address and registers the write data present on the data bus 206 in its corresponding registers 224a-224d during the first time. Similarly, when the master device 202 (or another module) transmits the second address together with a write request and write data on the data bus 206 during a second time, the second module 208b detects the presence of the second address and registers the write data present on the data bus 206 in its corresponding registers 226a-226d during the second time; and so on.

To initially setup the modules 208 in the second option (configuration with internal data), the data move requestor 212 controls copy operations of configuration data, which can for example be read from NVM module 216, and writes the configuration data to the respective modules, according to the contents of copy instruction table 214. This table may be configured to contain addresses for copy instructions to transfer data from locations in the NVM module 216 to addresses located in the modules 208.

To ensure the configuration data is free of bit errors and to ensure the configuration data is in fact written to correct address of the intended module, each module includes a local configuration checker and a unique identification code. Thus, the first module 208a may include a first local configuration checker 230a behind a first slave bus interface 234a, and is identified by a first multi-bit identification code 232a. The second module 208b includes a second local configuration checker 230b behind a second slave bus interface 234b, and is identified by a second multi-bit identification code 232b. The third module 208c includes a third local configuration checker 230c and a fourth local configuration checker 230d, which are arranged behind a third slave bus interface 234c. The third local configuration checker 230c and the fourth local configuration checker 230d are identified by a third multi-bit identification code 232c and fourth multi-bit identification code 232d, respectively. The first multi-bit identification code 232a, second multi-bit identification code 232b, third multi-bit identification code 232c, and fourth multi-bit identification code 232d are different from one another, are often hard-coded into the modules, and can be implemented by fuses, tying gates to ground or VDD, or other techniques. Each multi-bit identification code (e.g., 232a-232c) may be distinct from the address of the target address location or may be derived from the target address location.

When the master device 202 sets up the modules 208 or parts of modules 208, the master device 202 is configured to transmit configuration data for a module along with an expected error checking code 238 to the peripheral device including the target module.

In some examples, the error checking data 238 is calculated during run-time of a software routine executed by the master device 202 depending on the intended configuration data to be transferred. In other examples, the error checking data may be calculated prior to initial operation of the electronic circuit 200 (e.g., during software development of software routines executed in the master device), and may be calculated based on the configuration data for the module. Additionally, the error checking data calculation may include the multi-bit identification code 244 for the module.

Thus, for the first option for data transfer (configuration with external data) in FIG. 2 when initializing or modifying data of the first module 208a, the master device 202 can write first configuration data 242 and a first error checking data 238 to the registers 224a-224d of the first module 208a. The configuration data 242 and the identification code 244 may be used as input for a data checker encoder 246 generating error checking data 238. Error checking data 238 may be transferred together with the configuration data 242 from the master device 202 to the peripheral device 204. An additional address information may describe the address location in the peripheral device where the configuration data shall be stored after reception. The error checking data 238 may also include the address information.

In one example, configuration data 242 and the error checking data 238 may be stored as data in memory of the master device, because they have been calculated during the code generation process for the master device. In another example, the configuration data 242 may be generated during runtime of a software routine in the master device, e.g. as result of a calculation based on parameters available in the master device. In this case, the error checking data may also be generated during runtime of the software routine.

Alternatively for the second option for data transfer (configuration with internal data), data move requestor 212 may trigger a copy action of configuration data stored in the NVM module 216 via internal bus master 210 to perform a write operation of the configuration data read from a location in the NVM module 216 to a location in module 208 according to the values in the copy instruction table 214.

In one example, parts of the contents of the NVM module 216 may have been stored in the NVM module 216 during the production process of the peripheral device, e.g. at the end during the production test. These parts are often related to device specific information or parameters of the peripheral device itself, such as trimming values for reference generation or clock generation. In this case, the master device may be part of the production tester equipment for the peripheral device, such as a device tester platform.

In an example, other parts of the contents of the NVM module 216 may have been stored in the NVM during the manufacturing process of an ECU (electronic control unit) where the master device 202 and the peripheral device 204 are assembled together to a functional unit of the ECU. In this case, the master device may be part of the production tester equipment for the ECU, such as an ECU tester platform.

In an example, other parts of the contents of the NVM module 216 may have been stored in the NVM under the control of the master device during runtime of the ECU. In this case, the master device may be a control device of an ECU, such as a micro controller.

In one example, for example at start-up of the peripheral device 204 or as reaction to an event in the ECU (e.g., a wake request to leave a power saving mode), configuration data has to be copied from a location in the NVM module 216 of the peripheral device to a configuration register in module 208.

In another example, for example at start-up of the master device or as reaction to an event in the ECU (e.g. an interrupt event to the master device), configuration data has to be written from the master device to a configuration register in module 208.

After the copy action from the NVM module 216 or the write action by the master device 202, the configuration data stored in a data storage element (e.g. a register bit or bit field at a defined address location in module 208) matches the intended configuration data.

In some (rare) cases, the transfer of the configuration data to the intended configuration register in module 208 may have been corrupted (e.g. due to noise effects, voltage spikes, stuck-at errors, open contacts, etc.) and the configuration data in the intended configuration register does not match the intended value.

In other cases (due to same reasons as above), the address information where data has to be stored may be corrupted before or during the execution of a write action. In this case, the data contents itself might be correct, but stored at a wrong location. As a consequence, the data contents has to be considered as wrong, because it does not match what is needed/intended at that location.

In other cases (e.g. after a voltage spike on a supply line), the contents of a data storage location (e.g. a register in a module 208) may be corrupted after the data has been written. Therefore, to protect against such errors, the first module 208a includes a first local configuration checker 230a. The first local configuration checker 230a is configured to determine if the configuration data stored in the first module 208a is correct and intended for this location. The error checking data for the location may use a first multi-bit identification code 232a as an identification code for the location. The identification code value may be unique within the peripheral device (e.g. each local configuration checker may use a different identification code value). The configuration data in module 208a (224a, 224b, 224c) as well as the identification code value 232a are processed (e.g., hashed to provide a first message digest), and the result (e.g., the first message digest) is checked against a reference error checking data 224d. The reference error checking data may be stored in a location associated to module 208a. The contents of the reference error checking data may be calculated before executing any copy or write action, e.g. during the code generation process for the master device or on a tester platform. The pre-calculated contents may be transferred to the register location for the reference error checking data 224d via "normal" data write or copy actions.

Further, the first module is configured to selectively enable the first hardware function 222a based on a first pass/fail indication 240a. Thus, if the result is pass (e.g., first message digest is the same as reference error checking data 224d), the first hardware function 222a is enabled; but if the result is fail (e.g., the first message digest is different from the reference error checking data 224d), then an error is flagged (e.g., data error or address error) and the first hardware function 222a is disabled and/or the first module 208a, master device 202, and/or electronic circuit 200 enters a safe mode of operation with limited functionality.

Similarly, the second module 208b includes the second local configuration checker 230b. The second local configuration checker 230b is configured to determine a second pass/fail indication 240b based on the second actual configuration data in registers 226a-226c and the second multi-bit identification code 232b. The configuration data in module 208b (226a, 226b, 226c) as well as the identification code value 232b are processed (e.g., hashed to provide a second message digest), and the result (e.g., the second message digest) is checked against a reference error checking data 226d. Further, the second module is configured to selectively enable the second hardware function 222b based on a second pass/fail indication 240b. Thus, if the second result is pass (e.g., second message digest is the same as reference error checking data 226d), the second hardware function 222b is enabled; but if the result is fail (e.g., the second message digest is different from the reference error checking data 226d), then an error is flagged (e.g., data error or address error) and the second hardware function 222b is disabled and/or the second module 208b, master device 202, and/or electronic circuit 200 enters the safe mode of operation.

While the first and second modules 208a, 208b each include a single hardware function that is enabled or disabled behind a corresponding slave bus interface for the module, the third module 208c includes two or more hardware functions 222c, 222d that can be separately enabled or disabled behind a slave bus interface 234c. The functionality for the third module 208c is otherwise generally similar to that of the first and second modules 208a, 208b.

Thus, in FIG. 2's circuit, the local configuration checkers (230a, 230b, 230c, 230d) check not only whether the content of the configuration data is correct, but also use the local identifiers (232a, 232b, 232c, 232d) to determine whether the configuration data is written to the correct location within the system. In this way, some aspects of the present disclosure provide an approach where the NVM module 216 can be designed according to a more economical ASIL rating, such as a QM rating, while the overall IC can still have a higher ASIL rating due to the presence of the local configuration checkers.

Thus, as shown in FIG. 2, the master device 202 can include circuitry and/or instructions that are configured to read configuration data 242 for a given module and a unique identification code 244 corresponding to the given module. The master device also includes a data checker encoder 246 that calculates an actual error detection code 248 based on the configuration data 242 and the identification code 244 for the given module. Thus, for the first module 208a, the master device can read first configuration data (Cfg data@A0, Cfg data@A1, . . . , Cfg data@An) and calculate a first error checking data (e.g., check data@A 238).

In one example, the multi-bit identification code 244 for the module can be read for example from each module itself. In other examples, the identification code is known in the master device, e.g. because it is available as part of a header file (e.g. with defined constants).

In one example, the master device 202 may prepare the configuration data and the error checking data for a module 208 and writes the data into defined locations in the NVM module 216 of the peripheral device 204. The definition of the locations in the NVM module 216 corresponds to the definitions in the copy instruction table 214. In this example, after startup of the peripheral device, the configuration data and the error checking data are copied to from the NVM module 216 to the target locations.

In another example, the master device may prepare the configuration data and the error checking data for a module 208 and writes the data into target locations module 208 in the peripheral device.

In some cases, the master device 202 can include a look up table including a plurality of multi-bit identification codes corresponding to a plurality of modules, respectively. For the first multi-bit identification code corresponding to the first module, the look-up table can include a number of error checking data values corresponding to different configuration states for the first module. The look-up table can also include a number of multi-bit identification codes corresponding to a plurality of modules, respectively, and for the first multi-bit identification code corresponding to the first module includes a plurality of error checking data values corresponding to different configuration states for the first module. In some examples, the master device is configured calculate the first error checking data value based on both the first expected configuration data from the look-up table and the first multi-bit identification code from the look-up table. The first module is configured to calculate the pass/fail indication based on the first actual configuration data as received from over the data bus and the first hard-coded value in the first module.

The error detection function may also include an error correction function. In the case of an error related to the data contents, the data may be corrected and corrected data may be stored. In the case of an error related to the location (e.g. corrupted address information), the data contents may be considered as invalid and no correction takes place. The error detection function may deliver different indication signals to the peripheral device that may lead to different reactions. For example, the error detection function may deliver an information about data corruption (and optionally, also if data correction is/was possible). It may also deliver an information about data written to a wrong location.

The error detection function may use stored data (e.g. configuration data, error checking data) transferred from the master device (or the internal NVM) to a single storage location in module 208. In this example, the configuration data and the error checking data may be located at the same address. In another example, the error detection unit may use stored data from several storage locations. In this example, the configuration data and the error checking data may be located at different addresses.

The master device 202 may prepare configuration data and error checking data (including information about the target location) for a module 208, but does not directly write them to the target location in the peripheral device 204. The master device 202 may use other storage elements for intermediate storage, e.g. the NVM module 216 in the peripheral device. In this example, another mechanism for data transfer reads the configuration data and the error checking data from the intermediate storage location(s) and writes them to the target locations. The transfer of the data from the intermediate storage location to the target location may be triggered by an event, e.g. after power up of the peripheral device, upon request of a master device, or if an error detection unit indicates a failure, such as data corruption. The error checking data may refer to the target location, although it is stored at another (intermediate) location. For example, a data checker encoder 246 within the master device can calculate a first expected error correction code 238 to be stored in NVM module 216 and which will ultimately be written to first module 208a, wherein the first expected error correction code 238 is based on the first expected configuration data and the first identification code in 249.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

What is claimed is:

1. An electronic circuit, comprising:
   a data bus;
   a first module coupled to the data bus and corresponding to a first address, the first module configured to perform a first function and including a first local configuration checker having a first identification code; and
   a second module coupled to the data bus corresponding to a second address, the second module configured to perform a second function including a second local configuration checker having a second identification code that is distinct from the first identification code.

2. The electronic circuit of claim 1, wherein the first identification code is a first hard-coded, multi-bit value, and the second identification code is a second hard- coded, multi-bit value.

3. The electronic circuit of claim 1, wherein the first local configuration checker is configured to selectively enable the first function based on the first identification code.

4. The electronic circuit of claim 1, wherein the second local configuration checker is configured to selectively enable the second function based on the second identification code and independent of whether the first function is enabled.

5. The electronic circuit of claim 1, wherein the first local configuration checker is configured to deliver a first pass/fail indication based on the first identification code, and wherein the first module is configured to perform the first function according to a first configuration when the first pass/fail indication is a pass indication and to perform the first function according to a second, default configuration when the first pass/fail indication is a fail indication.

6. The electronic circuit of claim 1, wherein the first module includes a first storage location for first configuration data and first error checking data, wherein the first error checking data is based on the first configuration data and the first identification code.

7. The electronic circuit of claim 6, wherein the second module includes a second storage location for second configuration data and second error checking data, wherein the second error checking data is based on the second configuration data and the second identification code.

8. The electronic circuit of claim 7, wherein the second local configuration checker is configured to deliver a second pass/fail indication based on the second configuration data, the second error checking data, and the second identification code, and wherein the second module is configured to perform the second function according to the second configuration data when the second pass/fail indication is a pass indication and to perform the second function according to a default configuration when the second pass/fail indication is a fail indication, wherein the default configuration for the second function provides limited functionality compared to when the second function is performed according to the second configuration data.

9. An electronic circuit, comprising:
   a data bus;
   a plurality of modules coupled to the data bus and having a plurality of addresses, respectively, the plurality of modules configured to carry out respective hardware functions and including a plurality of local configuration checkers, respectively, the local configuration checkers having a plurality of identification codes, respectively, which differ from one another for the plurality of modules; and
   wherein a local configuration checker of a module is configured to provide a pass/fail indicator signal that is based on an identification code of the local configuration checker and configuration data provided to the module; and
   wherein the hardware function of the module is enabled based on the pass/fail indicator signal.

10. The electronic circuit of claim 9, wherein the plurality of identification codes, respectively are a plurality of hard-coded, multi-bit values, respectively.

11. The electronic circuit of claim 9, further comprising:
    a non-volatile memory module coupled to the plurality of modules via the data bus, the non-volatile memory module configured to store a plurality of expected error checking codes for the plurality of modules, respectively, and configured to store a plurality of expected configuration data for the plurality of modules, respectively, wherein a first expected error checking code is based on a first expected configuration data and a first identification code.

12. The electronic circuit of claim 11,
    wherein a first module of the plurality of modules is configured to receive first actual configuration data which is expected to correspond to the first expected configuration data and first actual error checking data which is expected to correspond to a first expected error checking data, the first module being further configured to perform a first hardware function and to determine a first verified error checking code based on the first actual configuration data and the first identification code of the first module.

13. The electronic circuit of claim 12, wherein a first local configuration checker is configured to selectively enable the first hardware function based on the first identification code.

14. The electronic circuit of claim 12, wherein a second local configuration checker is configured to selectively enable a second hardware function based on a second identification code and independent of whether the first hardware function is enabled.

15. The electronic circuit of claim 13, wherein the first local configuration checker is configured to deliver a first pass/fail indication based on the first identification code, and wherein the first module is configured to perform the first hardware function according to the first actual configuration data in case the first pass/fail indication is a pass indication and to perform the first hardware function according to a default configuration in case the first pass/fail indication is a fail indication.

16. A method, comprising:
reading a first configuration data and a first expected error checking code from a memory module and writing the first configuration data and the first expected error checking code to a first storage location in a first module;
determining a first actual error checking code based on the first configuration data and a first module identification code, wherein the first module identification code is hard-coded in the first module; and
comparing the first actual error checking code to the first expected error checking code, and enabling a first function for the first module when the first actual error checking code is the same as the first expected error checking code and disabling the first function when the first actual error checking code is different from the first expected error checking code.

\* \* \* \* \*